US012676905B2

(12) United States Patent
Zhang et al.

(10) Patent No.: US 12,676,905 B2
(45) Date of Patent: Jul. 7, 2026

(54) METHOD, APPARATUS, AND ELECTRONIC DEVICE FOR INTERACTION

(71) Applicant: Beijing Zitiao Network Technology Co., Ltd., Beijing (CN)

(72) Inventors: Shuang Zhang, Beijing (CN); Yitong Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 182 days.

(21) Appl. No.: 18/569,114

(22) PCT Filed: Jun. 15, 2022

(86) PCT No.: PCT/CN2022/098952
§ 371 (c)(1),
(2) Date: Dec. 11, 2023

(87) PCT Pub. No.: WO2023/273889
PCT Pub. Date: Jan. 5, 2023

(65) Prior Publication Data
US 2024/0340327 A1 Oct. 10, 2024

(30) Foreign Application Priority Data
Jun. 30, 2021 (CN) .......................... 202110740976.2

(51) Int. Cl.
*H04L 65/60* (2022.01)
*G06F 9/451* (2018.01)

(52) U.S. Cl.
CPC .............. *H04L 65/60* (2013.01); *G06F 9/451* (2018.02)

(58) Field of Classification Search
CPC ....... H04L 65/60; H04L 65/403; G06F 9/451; G06F 9/542
See application file for complete search history.

(56) References Cited

U.S. PATENT DOCUMENTS 11,343,293 B1 * 5/2022 Slotznick ............... H04N 5/272
2014/0149505 A1 5/2014 Christiansen
(Continued)

FOREIGN PATENT DOCUMENTS

CN 101039409 A 9/2007
CN 102244765 A 11/2011
(Continued)

OTHER PUBLICATIONS

International Search Report in PCT/CN2022/098952, mailed Aug. 25, 2022, 3 pages.
(Continued)

*Primary Examiner* — Caroline H Jahnige
(74) *Attorney, Agent, or Firm* — Astute IP Law Group

(57) ABSTRACT

Embodiments of the disclosure disclose a method and apparatus, and an electronic device for interaction. A specific embodiment of the method includes: generating a cross-group transmitting instruction based on an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space; obtaining a multimedia stream of the source participant object in response to the cross-group transmitting instruction; and transmitting the multimedia stream of the source participant object to a participant object in the destination meeting space. Thereby, a new interaction mode can be provided.

18 Claims, 7 Drawing Sheets

(56)                    References Cited

U.S. PATENT DOCUMENTS

| 2014/0267550 | A1* | 9/2014 | Nimri | ................... | H04N 7/152 |
| | | | | | 348/14.09 |
| 2016/0094593 | A1 | 3/2016 | Priya | | |
| 2017/0118271 | A1 | 4/2017 | Reyes | | |
| 2022/0353308 | A1* | 11/2022 | Han | ................... | H04L 12/1822 |

FOREIGN PATENT DOCUMENTS

| CN | 105915355 | A | 8/2016 |
| CN | 109891827 | A | 6/2019 |
| CN | 111147799 | A | 5/2020 |
| CN | 111478905 | A | 7/2020 |
| CN | 113885976 | A | 1/2022 |

OTHER PUBLICATIONS

Office Action in CN202110740976.2, mailed Jun. 9, 2023, 8 pages.
Webex, "Discuss broadcast messages to groups.," Webex Help Center, Aug. 24, 2023, 3 pages.

* cited by examiner

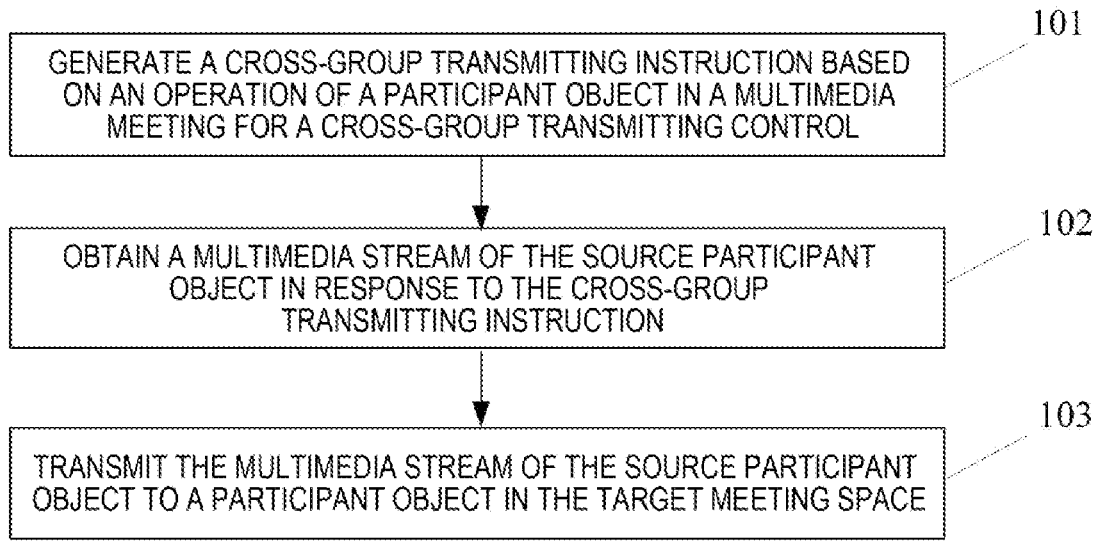

GENERATE A CROSS-GROUP TRANSMITTING INSTRUCTION BASED ON AN OPERATION OF A PARTICIPANT OBJECT IN A MULTIMEDIA MEETING FOR A CROSS-GROUP TRANSMITTING CONTROL — 101

OBTAIN A MULTIMEDIA STREAM OF THE SOURCE PARTICIPANT OBJECT IN RESPONSE TO THE CROSS-GROUP TRANSMITTING INSTRUCTION — 102

TRANSMIT THE MULTIMEDIA STREAM OF THE SOURCE PARTICIPANT OBJECT TO A PARTICIPANT OBJECT IN THE TARGET MEETING SPACE — 103

FIG. 1

METHOD, APPARATUS, AND ELECTRONIC DEVICE FOR INTERACTION

CROSS REFERENCE

This is a national stage application filed under 37 U.S.C. 371 based on International Patent Application No. PCT/CN2022/098952, filed Jun. 15, 2022, which claims priority to Chinese Patent Application No. 202110740976.2 filed on Jun. 30, 2021 and entitled "METHOD, APPARATUS, AND ELECTRONIC DEVICE FOR INTERACTION", the disclosures of which are incorporated herein by reference in their entireties.

FIELD

The present disclosure relates to the field of the Internet, and more particularly, to a method and apparatus, and electronic device for interaction.

BACKGROUND

With the development of the Internet, users are increasingly using the functions of terminal devices to make work and life more convenient. For example, users can open multimedia meetings with other users online through terminal devices. Through online multimedia meetings, users can achieve long-distance interaction and can also start meetings without having to gather in one place. Multimedia meetings largely avoid the location and venue restrictions of traditional face-to-face meetings.

SUMMARY

Summary of the present disclosure is provided to briefly introduce the concepts, which will be further described in detail in Detailed Descriptions. The Summary of the present disclosure is not intended to identify key or essential features of the claimed technical solution. The Summary of the present disclosure is not to limit the scope of the claimed technical solution.

In a first aspect, embodiments of the present disclosure provide a method for interaction. The method comprises: generating a cross-group transmitting instruction based on an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space; obtaining a multimedia stream of the source participant object in response to the cross-group transmitting instruction; and transmitting the multimedia stream of the source participant object to a participant object in the destination meeting space.

In a second aspect, the embodiments of the present disclosure provide an apparatus for interaction. The apparatus comprises: a generating unit configured to generate a cross-group transmitting instruction based on an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space; an obtaining unit configured to obtain a multimedia stream of the source participant object in response to the cross-group transmitting instruction; a transmitting unit configured to transmit the multimedia stream of the source participant object to a participant object in the destination meeting space.

In a third aspect, the embodiments of the present disclosure provide an electronic device comprising: one or more processors, a memory device for storing one or more programs which, when executed by the one or more processors, cause the one or more processors to implement the method for interaction as described in the first aspect.

In a fourth aspect, the embodiments of the present disclosure provide a computer readable storage medium on which a computer program is stored, the computer, when executed by a processor, performing the steps of the method for interaction as described in the first aspect.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, the same or similar reference signs indicate the same or similar elements. It should be understood that the drawings are illustrative and that the originals and elements are not necessarily drawn to scale.

FIG. 1 is a flowchart of an embodiment of a method for interaction according to the present disclosure.

DETAILED DESCRIPTION

Figure 2:
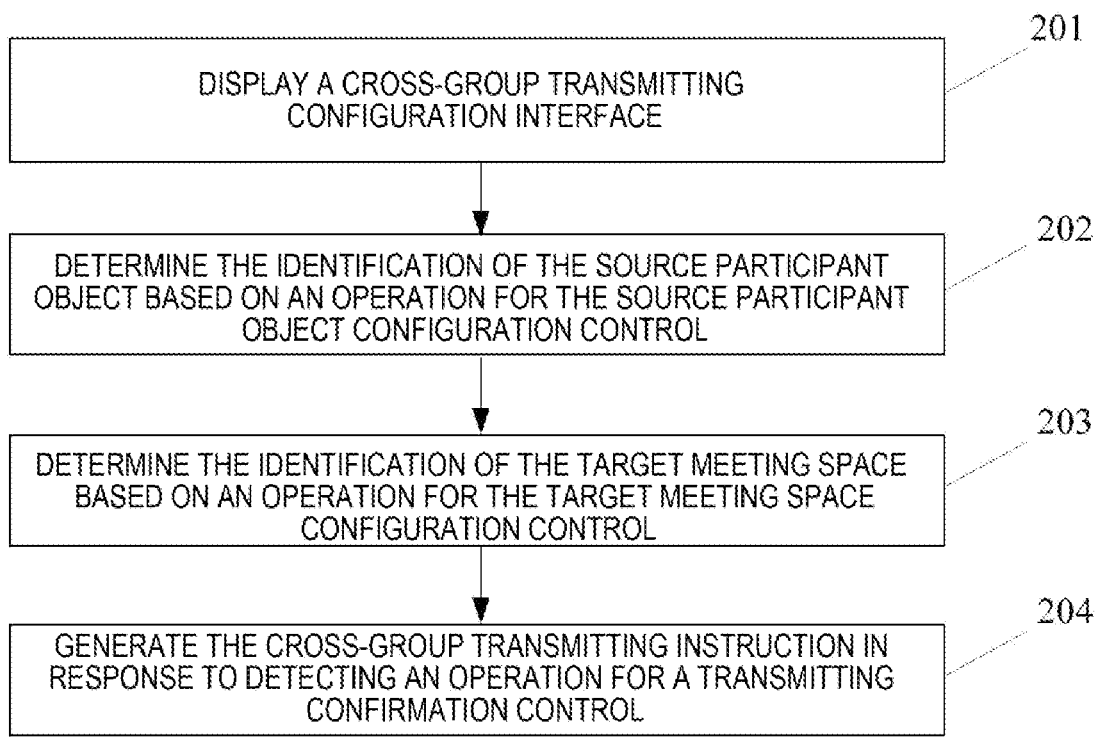
FIG. 2 is a schematic diagram of an implementation of a method for interaction according to the present disclosure.

Embodiments of the present disclosure will be described in more detail with reference to the accompanying drawings hereinafter. Although some embodiments of the present disclosure are shown in the drawings, it should be understood that the present disclosure may be implemented in various forms and should not be construed as limited to embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

It should be understood that various steps described in method implementations of the present disclosure may be performed in different order and/or in parallel. Furthermore, method implementations may include additional steps and/ or omit steps that are shown. The scope of the present disclosure is not limited in this regard.

In the description of embodiments of the present disclosure, the term "comprise(s)" and similar terms shall be understood as open inclusion, that is, "including but not limited to". The term "based on" is to be understood as "based at least in part on". The term "one embodiment" is to be understood as "at least one embodiment". The term "another embodiment" is to be understood as "at least one other embodiment". The term "some embodiments" is to be understood as "at least some embodiments". Other explicit and implicit definitions may also be comprised below.

It is to be noted that the concepts "first", "second" and the like used herein are only used to distinguish different apparatuses, modules or units, and they do not limit the order or the interdependence of functions performed by these apparatuses, modules or units.

It is to be noted that the expression "one" and "more" used herein are only for the purpose of illustrations rather than limitations, and those skilled in the art would understand that they are to be understood as "one or more" unless otherwise clearly indicated in the context.

Names of messages or information interacted between multiple apparatuses in the embodiment of the present disclosure are only for the purpose of illustrations and are not for the purpose of limiting the scope of these messages or information.

FIG. 1 shows the flow of the method for interaction according to embodiments of the present disclosure. As shown, the method for interaction includes the following steps.

Step 101, generating a cross-group transmitting instruction based on an operation of a participant object in a multimedia meeting for a cross-group transmitting control.

In the present embodiment, the actor (e.g., an terminal device and/or a server) of the method for interaction may generate a cross-group transmitting instruction based on an operation of a participant object in a multimedia meeting for a cross-group transmitting control.

In some application scenarios, the actor including the terminal device and the server may present various interfaces by the terminal device, and information exchange may be performed between the terminal device and the server. The server may generate corresponding instructions based on the operations detected by the terminal.

In some scenarios, the actor may include a terminal device and/or include a server.

In the present embodiment, the multimedia meeting may be an online conferencing using multimedia. The above multimedia meeting includes at least one of the following: audio conferencing, video conferencing. It will be appreciated that during the conference of the video conferencing, there is both audio interaction and video interaction. In some embodiments, the above multimedia meeting may be audio and video conferencing.

Herein, the above server may be used to support multimedia meetings.

In embodiments of the present disclosure, the application of multimedia meeting may be an application that provides multimedia meeting services at the server level. The type of such an application may be diverse and is not limited here. For example, the above application may be an instant video conferencing application, a communication application, a video playback application, and an email application, etc., and may also be a hosting program (such as an applet) for an application, and may also be a browser application for multimedia meeting functions provided through web pages.

It is to be noted that the application of the present disclosure not only is applicable to a mobile terminal, but also is an application installed on a terminal device (PC and other electronic devices).

In embodiments of the present disclosure, the multimedia meetings may include a participant object.

In embodiments of the present disclosure, the multimedia stream may include at least one of: audio data, video data.

In embodiments of the present disclosure, the multimedia meeting may include at least two meeting spaces.

In embodiments of the present disclosure, the meeting space in the multimedia meeting group may be used as an interactive unit, and participant objects inside the meeting space may communicate with each other. In some related technologies, the meeting spaces are isolated from each other. In layman's terms, the meeting spaces in multimedia meeting may be understood as the rooms that participant objects enter according to groups when group discussions are needed in physical meetings. The rooms are isolated from each other, that is, objects of different rooms may not see or hear each other.

In embodiments of the present disclosure, the style and display position of the cross-group transmitting control may be determined according to the actual application scenario and is not limited herein. The cross-group transmitting control may be one control or a collection of several controls.

In embodiments of the present disclosure, the cross-group transmitting instruction includes an identifier of the source participant object and an identifier of the destination meeting space. The identifier of the source participant object may be used to indicate the participant object from which the multimedia stream is transmitted across groups. The source participant object may not be in the destination meeting space, and thus, cross-group broadcasting may be achieved.

Step 102, obtaining a multimedia stream of the source participant object in response to the cross-group transmitting instruction.

In some application scenarios, the multimedia meeting may include six participant objects: A, B, C, D, E, and F. A may be a host of the multimedia meeting. A may assign C and D to a first meeting space and E and F to a second meeting space. At this time, a main venue of the multimedia meeting where A and B are located may also be understood as a meeting space, which we may call the main venue meeting space. The first meeting space, the second meeting space, and the main venue meeting space are independent meeting spaces. In some application scenarios, the meeting space may include a main venue and a discussion group, which may be different types of meeting spaces.

In some application scenarios, A may operate the cross-group transmitting control, and the terminal used by A may generate the cross-group transmitting instruction. As an example, A may specify itself as the source participant object, and A may specify the first meeting space as the destination meeting space.

Herein, the actor may obtain a multimedia stream of the source participant object based on the cross-group transmitting instruction.

Here, the multimedia stream of the source participant object may include at least one of the following, but be not limited to: audio data, video data. Video data may include at least one of the following: an environmental image collected in real time by the terminal used by the source participant object, and current presentation content of the source participant object.

Step 103, transmitting the multimedia stream of the source participant object to a participant object in the destination meeting space.

In embodiments of the present disclosure, the source participant object and the destination meeting space may be determined from the cross-group instruction, and then the multimedia stream of the source participant object may be transmitted to the participant object in the target group.

As an example, a multimedia meeting may include six participant objects: A, B, C, D, E, and F. A may be a host of the multimedia meeting. A may assign C and D to a first meeting space and E and F to a second meeting space. A's multimedia stream may be sent to C and D in the first meeting space based on A's cross-group transmitting instruction.

It may be understood that if the source participant object does not enter the destination meeting space, the source participant object transmits data in one-way to the participant object in the destination meeting space, that is, the participant object in the destination meeting space may receive the multimedia stream of the source participant object, but the source participant object cannot receive the multimedia stream of the participant object in the destination meeting space (in a case where the participant object in the destination meeting space is not used as the source participant object).

It should be noted that in the method for interaction provided by embodiments of the present disclosure, a cross-group transmitting instruction is generated based on an operation of a participant object in a multimedia meeting for a cross-group transmitting control, the cross-group transmitting instruction comprising an identification of a source participant object and an identification of a destination meeting space: the multimedia stream of the source participant object may be transmitted to a participant object in the destination meeting space based on the cross-group transmitting instruction. Thereby, a new interaction pattern may be provided, which may realize information exchange between meeting spaces in multimedia meetings. While ensuring internal communication in respective meeting spaces and information isolation between different meeting spaces, the multimedia stream of the source participant object may be published to other meeting spaces, thereby realizing continuous cross-group penetration of the real-time multimedia stream and improving the efficiency of information exchange in multimedia meetings.

In some embodiments, the multimedia meeting comprises a plurality of discussion groups, and each of the discussion groups comprises at least a portion of participant objects in the multimedia meeting. The destination meeting space is at least one of the plurality of discussion groups.

Optionally, the discussion group is a first type of meeting space, and the main venue is a second type of meeting space. Differences may be set between different types of meeting spaces according to actual needs. For example, participant objects that are not in the discussion group are all in the main venue.

Herein, at least one of a plurality of meeting groups in the destination meeting space, in other words, the destination meeting space may be a first type of meeting space.

In some embodiments, the source participant object is in one of the discussion groups.

Herein, the source participant object is in a discussion group, and if the destination meeting space is also a discussion group, the cross-group broadcasting from discussion group to discussion group may be realized.

In some embodiments, the multimedia meeting includes a main venue, and the main venue including a participant object that is not in any discussion group. The source participant object is in the main venue.

Herein, the multimedia meeting may include a main venue, which is a second type of meeting space. Participant objects that withdraw from the discussion group or participant objects after dismissing of the discussion group may be automatically included in the main venue.

Herein, the source participant object is in the main venue. If the destination meeting space is a discussion group, then cross-group broadcasting form main venue to discussion group may be realized.

In some embodiments, the above step 102 may include: obtaining the multimedia stream generated by the source participant object after a generation time instant of the cross-group transmitting instruction in response to the cross-group transmitting instruction.

As an example, a host clicks a transmitting confirmation control to generate a cross-group transmitting instruction at exactly zero o'clock. After the generation time instant, i.e., zero o'clock, of the cross-group transmitting instruction, the multimedia stream generated by the source participant object (such as user A) may be used as content. The multimedia stream of the source participant object before the time instant of zero o'clock may not be used as content transmitted across groups.

It should be noted that after the cross-group transmitting instruction, the multimedia stream of the source participant object is automatically obtained for cross-group transmission, which may realize continuous transmission of the multimedia stream of the source participant object, thereby improving the amount of information transmission, and improving the interaction efficiency of multimedia meetings.

In contrast, in some related technologies, the text entered by a user at one time may be transmitted to other meeting spaces: in this way, if a large amount of information needs to be quickly disseminated, the user may only input the text again and again and click to transmit again and again. As a result, the interaction efficiency is low, and it is difficult to meet the real-time and efficient information transmission requirements in multimedia meeting scenarios.

In some embodiments, the above step 103 may include: establishing a subscription correspondence between the participant object of the destination meeting space and the source participant object, based on the cross-group instruction; and transmitting, based on the established subscription correspondence, the multimedia stream generated by the source participant object to the participant object in the destination meeting space.

Herein, the above subscription correspondence, the participant object in the destination meeting space may subscript the multimedia stream of the source participant object.

Herein, the subscription correspondence may be established based on the cross-group transmitting instruction, may be released based on the transmitting ending instruction.

In some application scenarios, different meeting spaces (sub-channels) may be established in a multimedia meeting, and audio & video streams (including shared content streams) may be distinguished by tagging each stream with a different channel. This may achieve, by subscribing the streams of users in each meeting space to each other, real-time communication within the group and synchronously viewing of shared content in the same meeting, thereby achieving independent discussion for each meeting space.

Thereby, by establishing subscription correspondence, realize the, to achieve the continuous cross-group transmission of the multimedia stream of the source participant object may be achieved by using a logic of group meeting in a multimedia server, thereby improving conference efficiency.

In some embodiments, the above multimedia stream may include a first presentation content being presented by the source participant object.

Herein, the first presentation content may be content being presented by the source participant object.

As an example, the first presentation content may include but be not limited to at least one of the following: screen sharing content, shared documents. The "first" in the first presentation content does not constitute a limitation on the presentation content.

As a result, the presentation content of the source participant object may be spread across groups to other meeting spaces in real time, realizing the cross-group presentation of the source participant object. It should be noted that the cross-group presentation may quickly and vividly convey the content that needs to be conveyed to other groups while maintaining the independence of other groups.

In some application scenarios, each meeting space that receives cross-group presentation content may communicate internally, but the meeting spaces cannot interact with each other. Thereby, through a presentation of a presentation content, the reaction information of members in different meeting spaces to the same presentation content may be obtained.

In some embodiments, the method further comprises: displaying the multimedia stream of the source participant object in a multimedia meeting interface of the destination meeting space.

Herein, the multimedia stream of source participant object may be displayed on the multimedia interface of the participant object in the destination meeting space.

Thereby, the participant object in the destination meeting space can timely obtain the multimedia stream of the source participant object, achieving cross-group broadcasting.

In some embodiments, the displaying the multimedia stream of the source participant object in a multimedia meeting interface of the destination meeting space comprises: displaying the multimedia stream of the source participant object in the multimedia meeting interface of the destination meeting space, and displaying the multimedia stream of the participant object in the destination meeting space.

It is to be understood that the multimedia interface of the destination meeting space may refer to the multimedia meeting interface presented by the client of the participant object of the destination meeting space. In the multimedia meeting interface of the participant object of the destination meeting space, not only the multimedia of the source participant object may be displayed, but also the multimedia stream of the participant object in the destination meeting space may be displayed at the same time.

As a result, while achieving cross-group broadcasting, the multimedia stream of the participant object of the destination meeting space may also be displayed. Thus, the content of the destination meeting space and the content of cross-group broadcasting may be displayed at the same time, thereby increasing the amount of meeting information displayed in the destination meeting space.

In some embodiments, displaying the multimedia stream of the source participant object in a multimedia meeting interface of the destination meeting space comprises: displaying the multimedia stream of the source participant object in a shared content presenting region of the destination meeting space.

Optionally, the shared content presenting region is generally displayed in the middle of the multimedia meeting interface and occupies a larger position in the multimedia meeting interface.

In the shared content presenting region, displaying the multimedia stream of the source participant object may prompt users of the destination meeting space with cross-group broadcasting content to avoid users of the destination meeting space missing the cross-group broadcasting content.

In some embodiments, the above step of displaying the multimedia stream of the source participant object in a shared content presenting region of the destination meeting space may comprise: in response to a second presentation content being displayed in the shared content presenting region of the destination meeting space, replacing the second presentation content displayed in the shared content presenting region with the multimedia stream of the source participant object.

It may be understood that the shared content presenting region of the destination meeting space may refer to the shared content presenting region presented in the multimedia meeting interface presented by the client of the participant object of the destination meeting space.

In some application scenarios, the shared content presenting region of the destination meeting space may be displaying the second presentation content. In some embodiments, the second presentation content may be replaced with a multimedia stream of the source participant object.

Thereby, the user may be strongly reminded, so that the user's attention is directed to the inserted multimedia stream of source participant object, thereby trying to ensure that the participant object in destination meeting space will not miss the cross-group broadcasting content.

In some embodiments, the above steps of in response to a second presentation content being displayed in the shared content presenting region of the destination meeting space, replacing the second presentation content displayed in the shared content presenting region with the multimedia stream of the source participant object may comprise: in response to the second presentation content being displayed in the shared content presenting region of the destination meeting space, determining whether the multimedia stream of the source participant object comprises the first presentation content; and in accordance with a determination that the multimedia stream of the source participant object comprises the first presentation content, replacing the second presentation content displayed in the shared content presenting region with the first presentation content.

Herein, the multimedia stream of the source participant object can include the first presentation content or cannot include the first presentation content.

In some application scenarios, if the multimedia stream of the source participant object includes a first presentation content, the second presentation content that is being presented by the shared content presenting region of the meeting object in the destination meeting space can be replaced with the first presentation content.

Optionally, if the multimedia stream of the source participant object does not include the first presentation content, the second presentation content being presented in the shared content presenting region of the meeting object in the destination meeting space can be continued, and the multimedia stream of the source participant object is not occupied by the shared content presenting region.

Thereby, when the source participant object does not have the presentation content cross-group broadcast, it can be ensured that the second presentation content in the destination meeting space continues to be presented, and the original meeting of the destination meeting space is continuously carried out.

In some embodiments, the displaying the multimedia stream of the source participant object in a shared content presenting region of the destination meeting space comprises: in response to the second presentation content being displayed in the shared content presenting region of the destination meeting space, displaying the second presentation content and the multimedia stream of the source participant object in the shared content presenting region of the destination meeting space.

Herein, if the second presentation content is being presented in the shared content presenting region of the destination meeting space, the second presentation content can continue to be presented, and at the same time, the multimedia stream of the source parameter object can be presented in the shared content presenting region of the destination meeting space.

Thereby, the user can be strongly reminded to avoid the user missed cross-group broadcast content, while ensuring that the second presentation content in the destination meeting space continues to be presented, and the original meeting of the destination meeting space is continuously carried out.

In some embodiments, the multimedia stream comprises a first presentation content. The in response to the second presentation content being displayed in the shared content presenting region of the destination meeting space, displaying the second presentation content and the multimedia stream of the source participant object in the shared content presenting region of the destination meeting space comprises: in response to the second presentation content being displayed in the shared content presenting region of the destination meeting space, displaying the first presentation content and the second presentation content in the shared content presenting region of the destination meeting space.

In some scenarios, if the participant object of the destination meeting space is displaying the second presentation content, and the source participant object has the first presentation content, then the first presentation content and the second presentation content can be displayed simultaneously in the shared content presenting region of the destination meeting space.

Thereby, the participant object of the destination meeting space can obtain the information of the first presentation content and second presentation content, thereby the user is prevented from missing the first presentation content in the cross-group broadcast content, the second presentation content in the destination meeting space is ensured to be continuously demonstrated, and the original meeting of the destination meeting space is continuously carried out.

In some embodiments, the cross-group transmitting instruction may include a content type.

Herein, the content type may indicate the type of multimedia stream transmitted to the destination meeting space.

In some embodiments, the content type comprises at least one of: an audio, a user environment image collected in real time, a shared screen, a shared document.

Herein, the above step 103 may includes: filtering, from the multimedia stream of the source participant object, a multimedia stream that conforms to the content type in the cross-group transmitting instruction; and transmitting the filtered multimedia stream to the participant object of the destination meeting space.

As an example, the content type in the cross-group transmitting instruction includes shared documents. Then, the shared document in the multimedia stream of the source participant object can be obtained. And sending the shared document to the participant object of the destination meeting space.

Thereby, the content type of cross-group sending can be flexibly selected. Through a setting the content type, various types of multimedia can be avoided from being transmitted across groups, which can reduce the consumption of communication resources. By setting a limited content type, information security can be ensured as much as possible while meeting the needs of cross-group interaction.

As an example, the host needs to send a notification to the meeting space to stop the discussion and provide a conclusion. At this time, the host can set the content type to audio type without turning on a video types such as screen sharing. This can reduce communication volume while ensuring that the information exchange needs are met, and it is ensured that the interaction information of the host's group is not leaked.

In some embodiments, the above step 101 can include the process shown in FIG. 2. The process shown in FIG. 2 includes steps 201, 202, 203, and 204.

Step 201, displaying a cross-group transmitting configuration interface.

Herein, the terminal device can display the cross-group transmitting configuration interface.

Herein, the cross-group transmitting configuration interface can be used to configure various parameter items required for cross-group transmission.

In some embodiments, the cross-group transmitting configuration interface can include at least one of the following but not limited to: a source participant object configuration control and a destination meeting space configuration control.

Herein, the source participant object determination control can be used for the user to determine the source participant object. As an example, the user can determine the source participant object by input or selection manner.

Herein, the destination meeting space configuration control can be used for the user to determine the destination meeting space. As an example, the user can determine the destination meeting space by input or selection manner.

Herein, the cross-group transmitting configuration interface can be a separate interface or a sub-region of a separate interface. The display of the cross-group transmitting configuration interface can have trigger conditions or can be displayed in the general configuration interface or the meeting space scene configuration interface.

Figure 3A:
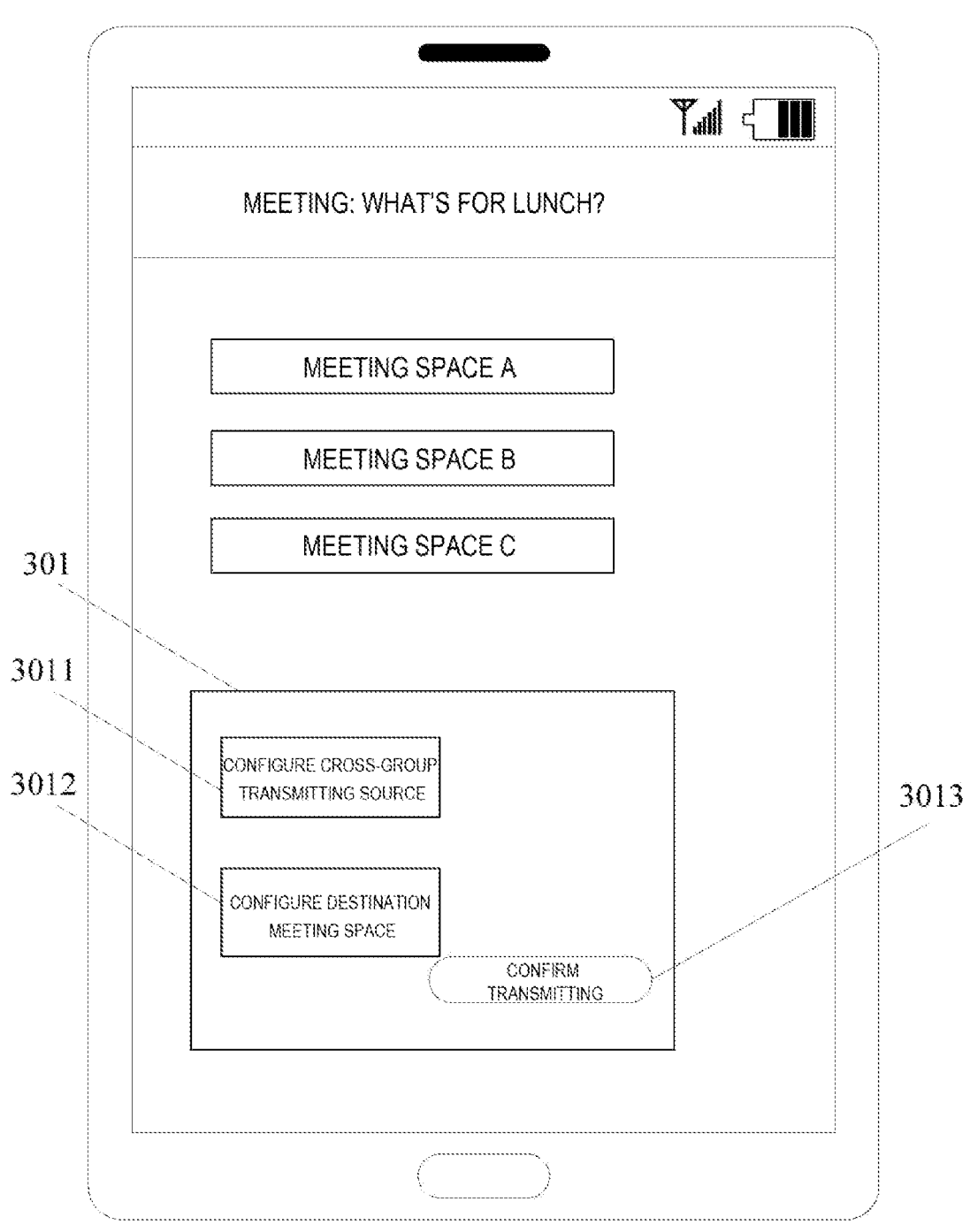
FIGS. 3A and 3B are schematic diagrams of an application scenario of the method for interaction according to the present disclosure.

Please refer to FIG. 3A, which shows the cross-group transmitting configuration interface.

In FIG. 3A, the cross-group transmitting configuration interface 301 can be displayed in the multimedia meeting interface. The source participant object configuration control 3011 can indicate a word configuration of cross-group transmission sources. Destination meeting space configuration control 3012 can indicate a word configuration of destination meeting space. It can be understood that the source participant object configuration control 3011 and the destination meeting space configuration control 3012 shown in FIG. 3A are exemplary, and do not constitute a limitation on source participant configuration object control or destination meeting space configuration control.

Step 202, determining the identification of the source participant object based on an operation for the source participant object configuration control.

In some application scenarios, the source participant object configuration control 3011 may display the participant object identifier for the user to select participant object as the source participant object.

In some application scenarios, the source participant object configuration control 3011 may receive information input by the user, the user input information matches the participant object, if the user selects the matched participant object, the user can select the participant object is determined as the source participant object.

Step 203, determining the identification of the destination meeting space based on an operation for the destination meeting space configuration control.

In some application scenarios, the destination meeting space configuration control 3012 can display the identification of meeting space for the user to select the identification of meeting space as the destination meeting space.

In some application scenarios, the destination meeting space configuration control 3012 can receive information input by the user. Based on the information input by the user matches the identification of meeting space, and if the user selects the matched identification of meeting space, the identification of meeting space selected by the user can be determined as the identification of destination meeting space identifier.

Step 204, generating the cross-group transmitting instruction in response to detecting an operation for a transmitting confirmation control.

As an example, please refer to FIG. 3A, which shows the transmitting confirmation control 3013. The transmitting confirmation control 3013 can indicate a word to confirm transmitting.

In some application scenarios, in the cross-group transmitting configuration interface, the source participant object configuration control can be displayed without displaying the destination meeting space configuration control. In this case, the destination meeting space can be defaulted as all meeting spaces.

In some application scenarios, in the cross-group transmitting configuration interface, the destination meeting space configuration control can be displayed without displaying the source participant object configuration control. In this case, the source participant object can be defaulted as a local login user.

In some application scenarios, if the user configures the source participant object through the source participant object configuration control without operating the destination meeting space configuration control, the meeting space (such as all meeting spaces) can be defaulted as the destination meeting space.

In some application scenarios, if the user configures the destination meeting space through the destination meeting space configuration control without operating the source participant object, the participant object (such as the local login user) can be defaulted as the source participant object.

It should be noted that the cross-group transmitting boot control is displayed, and the source participant object configuration control is displayed based on the trigger operation of the cross-group transmitting boot control, so that the user can determine the publisher of the cross-group transmitting, and thus, it is possible to realize that determine whose multimedia stream is transmitted across-group based on actual application scenarios.

It should be noted that the cross-group transmitting boot control is displayed and the destination meeting space configuration control is displayed based on the trigger operation of the cross-group transmitting boot control, so that the user can determine the meeting space to which the cross-group transmitting is transmitted, and thus, it is possible to realize that the meeting space to which the multimedia stream of the source participant object is transmitted can be determined according to the actual application scenario.

In some embodiments, the above step 101 may further comprise: a multimedia meeting interface having cross-group transmitting permission, the multimedia meeting interface display boot control; in response to detecting a trigger operation for boot control, the multimedia meeting interface display the cross-group transmitting configuration interface.

Herein, the cross-group transmitting permission can be used to represent the permission to transmit multimedia stream instructions of the source participant object (oneself or others) to the destination meeting space (meeting space other than the meeting space where the source participant object is located). In other words, the destination meeting space and the meeting space where the source participant object is located are different meeting spaces.

As an example, the user A has the cross-group transmitting permission, and the user A indicates that may transmit the multimedia stream of himself (user A) or other participant object (e.g., user B) to the destination meeting space.

Figure 3B:
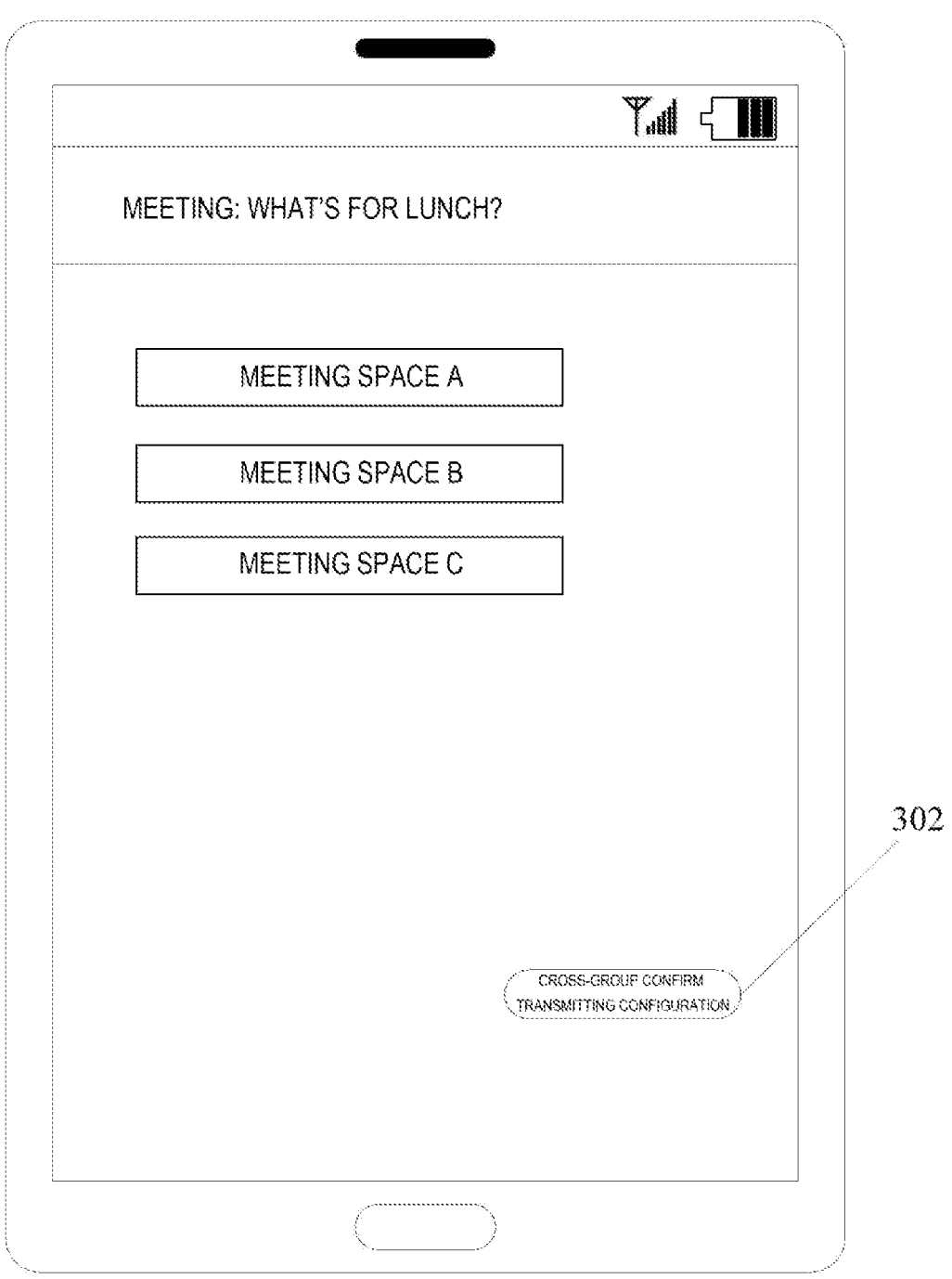

Please refer to FIG. 3B. The multimedia meeting interface shown in FIG. 3B can be the multimedia meeting interface displayed at a participant object with the cross-group transmitting permission. The multimedia meeting interface can display boot control 302, which can indicate the cross-group transmission configuration.

As an example, the user A has the cross-group transmitting permission, the multimedia meeting interface of the user A can display the boot control; and the user B does not have the cross-group transmitting permission, and the multimedia meeting interface of user B can not display the cross-group transmitting boot control.

Herein, in response to detecting a trigger operation for the cross-group transmission boot control, the cross-group transmitting configuration interface is displayed.

It should be noted that the boot control is displayed on the multimedia meeting interface with cross-group transmitting permission, and the cross-group transmitting configuration interface is displayed according to the trigger operation of the boot control, the control of the cross-group transmitting permission can be realized and the cross-group transmitting function from being abused by unauthorized users. Thereby, it is possible to ensure that the multimedia meetings is carried out in an orderly manner as much as possible, and that the interactive efficiency of multimedia meetings in group discussion scenarios is ensured.

In some embodiments, the method further comprises: displaying a transmitting confirmation control; in response to detecting a trigger operation for the transmitting confirmation control, determining the local login user as the source participant object, and determining all or part of the meeting space as the destination meeting space; and generating the cross-group transmitting instruction with the determined source participant object and destination meeting space.

Figure 4:
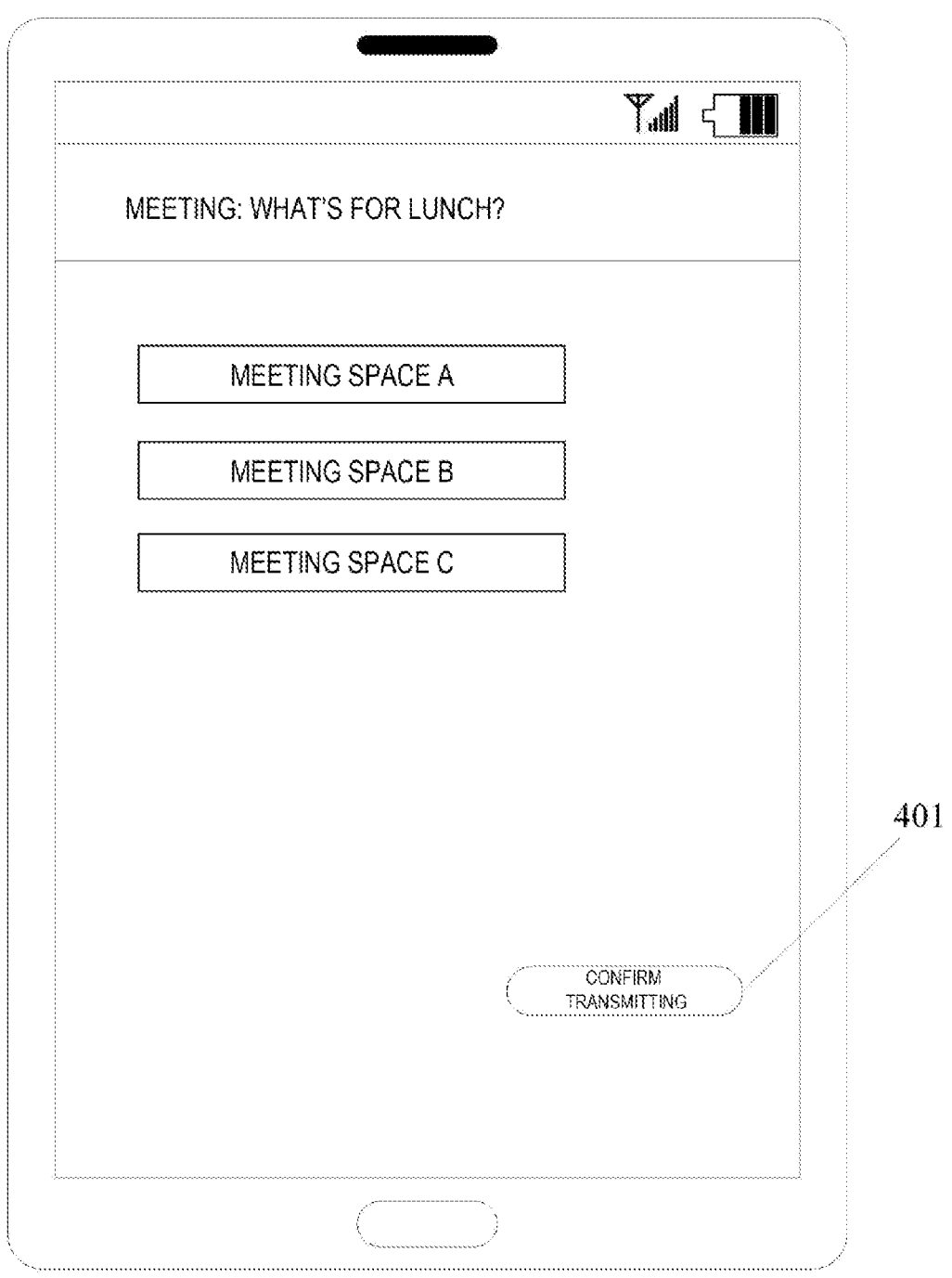
FIG. 4 is a schematic diagram of another application scenario of the method for interaction according to the present disclosure.

As an example, please refer to FIG. 4, which shows the transmitting confirmation control 401. In the application scenario shown in FIG. 4, the source participant object and destination meeting space can be configured by default or pre-configured by the user. The user can directly trigger the transmitting confirmation control 401 to achieve cross-group transmitting to the default configured meeting space.

It should be noted that the technical solution shown in FIG. 4 can reduce the operation steps between cross-group transmitting and improve the speed of cross-group transmitting, thereby realizing fast cross-group transmitting.

In some embodiments, the boot control shown in FIG. 3B and the transmitting confirmation control shown in FIG. 4 can be displayed in the same interface. Thereby, the user can selectively trigger boot control or transmitting confirmation control according to the needs of actual application scenarios and take into account the accuracy and timeliness of cross-group transmission.

In some embodiments, the method further comprises: generating a transmitting ending instruction in response to a predefined transmitting ending action; and stopping transmitting the multimedia stream of the source participant object to the participant object in the destination meeting space in response to the transmitting ending instruction.

Herein, the transmitting ending instruction may indicate the end of the cross-group transmitting.

Herein, the generation of transmitting ending instructions can be triggered in various ways.

In some application scenarios, the user transmit a predetermine end word as a condition for triggering the generation of transmitting ending instructions. For example, the user can say "stopping across groups transmitting", and the actor responds to the "stopping across-group transmitting" obtained through speech recognition and matches a "predetermine end word" to generate transmitting ending instructions.

In some application scenarios, the user can click on the predetermined end control to trigger the generation of transmitting ending instructions.

It should be noted that the generating a transmitting ending instruction in response to a predefined transmitting ending action. The transmitting ending instruction can indicate to stop cross-group transmitting. Thereby, it is possible to stop cross-group transmitting according to the situation, and while ensuring cross-group interaction efficiency, cross-group transmitting can be stopped in a timely manner to ensure information security.

In some embodiments, the generating a transmitting ending instruction in response to a predefined transmitting ending action comprises: displaying a transmitting confirmation control of a first type; in response to detecting a trigger operation for the transmitting confirmation control of the first type, generating the cross-group transmitting instruction and displaying a transmitting cancellation control; and in response to detecting a trigger operation for a transmitting cancellation control, generating the transmitting ending instruction.

As an example, the user can click to trigger the transmitting confirmation control of a first type, and the cross-group transmitting instruction can be generated based on the user's click triggering. During cross-group transmitting, the transmitting cancellation control can be displayed. The user can click on the transmitting cancellation control to trigger the generation of the transmitting ending instruction.

As an example, when transmitting cancellation control is displayed, the transmitting confirmation control of first type may disappear, may continue to display.

It should be noted that setting the above transmitting confirmation control of first type allows user to freely and flexibly perform other operations after triggering cross-group transmitting without continuing to pay attention to cross-group transmitting transactions. As a result, this can improve the interaction efficiency of multimedia meetings in cross-group transmitting scenarios.

In some embodiments, in response to the predefined transmitting ending action, generating transmitting ending instruction may include: displaying transmitting confirmation control of a second type; in response to detecting the continuous pressing operation for transmitting confirmation control of a second type, generating cross-group transmitting instruction; in response to detecting the end of the continuous pressing operation, generating transmitting ending instruction.

Herein, for the transmitting confirmation control of second type, the user may continue to press the transmitting confirmation control of second type of duration, as the duration of transmission across groups.

Herein, the transmitting confirmation control in FIG. 3B may be the transmitting confirmation control of first type, or may be the transmitting confirmation control of second type.

Herein, the transmitting confirmation control in FIG. 4 may be the transmitting confirmation control of first type, or may be the transmitting confirmation control of second type.

It should be noted that setting the above the second type of transmitting confirmation control can perform cross-group transmitting during the user pressing operation, once the user stops the pressing operation, the cross-group transmitting is not performed. Thereby, this can avoid information leakage caused by users forgetting that cross-group transmitting is in progress.

Figure 5:
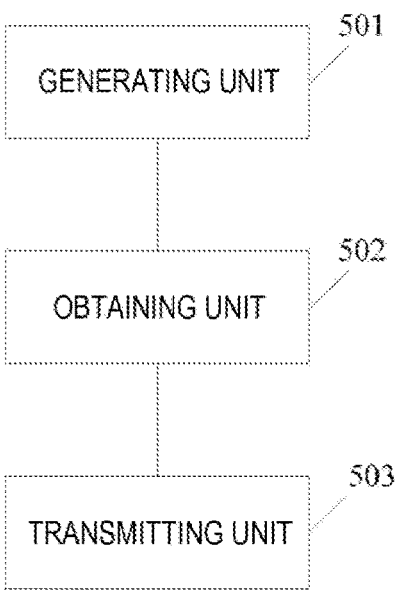
FIG. 5 is a schematic structural diagram of an embodiment of the apparatus for interaction according to the present disclosure.

With further reference to FIG. 5, as an implementation of the method shown in the above figures, the present disclosure provides an embodiment of an apparatus for interaction, the apparatus embodiment corresponds to the method embodiment shown in FIG. 1, the apparatus may be specifically applied in various electronic device.

As shown in FIG. 5, the apparatus for interaction of the present embodiment includes: generating unit 501, obtaining unit 502, and transmitting unit 503. Wherein the generating unit configured to generate a cross-group transmitting instruction based on an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space. The obtaining unit configured to obtain a multimedia stream of the source participant object in response to the cross-group transmitting instruction. The transmitting unit configured to transmit the multimedia stream of the source participant object to a participant object in the destination meeting space.

In the present embodiment, the specific processing of the generating unit 501, obtaining unit 502 and transmitting unit 503 of the apparatus for interaction and the technical effects thereof can be referred to the step 101, step 102 and step 103 in the corresponding embodiment with reference to FIG. 1, respectively, description not repeated herein.

In some embodiments, the obtaining a multimedia stream of the source participant object to the in response to the cross-group transmitting instruction comprises: obtaining the multimedia stream generated by the source participant object after a generation time instant of the cross-group transmitting instruction in response to the cross-group transmitting instruction.

In some embodiments, the transmitting the multimedia stream of the source participant object to the participant object in the destination meeting space comprises: establishing a subscription correspondence between the participant object of the destination meeting space and the source participant object, based on the cross-group instruction; and transmitting, based on the established subscription correspondence, the multimedia stream generated by the source participant object to the participant object in the destination meeting space.

In some embodiments, the multimedia stream comprises a first presentation content being presented by the source participant object.

In some embodiments, the apparatus displays the multimedia stream of the source participant object in a multimedia meeting interface of the destination meeting space.

In some embodiments, the displaying the multimedia stream of the source participant object in a multimedia meeting interface of the destination meeting space comprises: displaying the multimedia stream of the source participant object in the multimedia meeting interface of the destination meeting space, and displaying the multimedia stream of the participant object in the destination meeting space.

In some embodiments, the displaying the multimedia stream of the source participant object in a multimedia meeting interface of the destination meeting space comprises: displaying the multimedia stream of the source participant object in a shared content presenting region of the destination meeting space.

In some embodiments, the displaying the multimedia stream of the source participant object in a shared content presenting region of the destination meeting space comprises: in response to a second presentation content being displayed in the shared content presenting region of the destination meeting space, replacing the second presentation content displayed in the shared content presenting region with the multimedia stream of the source participant object.

In some embodiments, the in response to a second presentation content being displayed in the shared content presenting region of the destination meeting space, replacing the second presentation content displayed in the shared content presenting region with the multimedia stream of the source participant object comprises: in response to the second presentation content being displayed in the shared content presenting region of the destination meeting space, determining whether the multimedia stream of the source participant object comprises the first presentation content; and in accordance with a determination that the multimedia stream of the source participant object comprises the first presentation content, replacing the second presentation content displayed in the shared content presenting region with the first presentation content.

In some embodiments, the displaying the multimedia stream of the source participant object in a shared content presenting region of the destination meeting space comprises: in response to the second presentation content being displayed in the shared content presenting region of the destination meeting space, displaying the second presentation content and the multimedia stream of the source participant object in the shared content presenting region of the destination meeting space.

In some embodiments, the multimedia stream comprises a first presentation content; and the in response to the second presentation content being displayed in the shared content presenting region of the destination meeting space, displaying the second presentation content and the multimedia stream of the source participant object in the shared content presenting region of the destination meeting space comprises: in response to the second presentation content being displayed in the shared content presenting region of the destination meeting space, displaying the first presentation content and the second presentation content in the shared content presenting region of the destination meeting space.

In some embodiments, the cross-group transmitting instruction comprises a content type; and the method further comprises: displaying a cross-group transmitting content configuration control; determining the content type based on an operation for the content type configuration control, wherein a content type indicates a type of a multimedia stream transmitted to the destination meeting space; and the transmitting the multimedia stream of the source participant object to the participant object in the destination meeting space comprises: filtering, from the multimedia stream of the source participant object, a multimedia stream that conforms to the content type in the cross-group transmitting instruction; and transmitting the filtered multimedia stream to the participant object of the destination meeting space.

In some embodiments, the content type comprises at least one of: an audio, a user environment image collected in real time, a shared screen, a shared document.

In some embodiments, the generating a cross-group transmitting instruction based on an operation of a participant object in a multimedia meeting for a cross-group transmitting control comprises: displaying a cross-group transmitting configuration interface, wherein the cross-group transmitting configuration interface comprises at least one of: a source participant object configuration control and a destination meeting space configuration control; determining the identification of the source participant object based on an operation for the source participant object configuration control; determining the identification of the destination meeting space based on an operation for the destination meeting space configuration control; and generating the cross-group transmitting instruction in response to detecting an operation for a transmitting confirmation control.

In some embodiments, the generating a cross-group transmitting instruction based on an operation of a participant object in a multimedia meeting for a cross-group transmitting control comprises: displaying a boot control in the multimedia meeting interface having a cross-group transmitting permission; and displaying the cross-group transmitting configuration interface in response to detecting a trigger operation for the boot control.

In some embodiments, the generating a cross-group transmitting instruction based on an operation of a participant object in a multimedia meeting on a cross-group transmitting control comprises: displaying a transmitting confirmation control; in response to detecting a trigger operation for the transmitting confirmation control, determining the local login user as the source participant object, and determining all or part of the meeting space as the destination meeting space; and generating the cross-group transmitting instruction with the determined source participant object and destination meeting space.

In some embodiments, the apparatus generates a transmitting ending instruction in response to a predefined transmitting ending action; and stopping transmitting the multimedia stream of the source participant object to the participant object in the destination meeting space in response to the transmitting ending instruction.

In some embodiments, the generating a transmitting ending instruction in response to a predefined transmitting ending action comprises: displaying a transmitting confirmation control of a first type; in response to detecting a trigger operation for the transmitting confirmation control of the first type, generating the cross-group transmitting instruction and displaying a transmitting cancellation control; and in response to detecting a trigger operation for a transmitting cancellation control, generating the transmitting ending instruction.

In some embodiments, the generating a transmitting ending instruction in response to a predefined transmitting end action comprises: displaying a transmitting confirmation control of a second type; generating the cross-group transmitting instruction in response to the detecting a continuous pressing operation for the second type of transmitting confirmation control; and generating the transmitting ending instruction in response to detecting the end of the continuous pressing operation.

In some embodiments, the multimedia meeting comprises a plurality of discussion groups, each of the discussion groups comprises at least a part of participant objects of the plurality of multimedia meeting, and the destination meeting space is at least one of the plurality of discussion groups.

In some embodiments, the source participant object is in one of the discussion groups.

In some embodiments, the multimedia meeting comprises a main venue, the main venue comprises a participant object which is not in any discussion group, and the source participant object is in the main venue.

Figure 6:
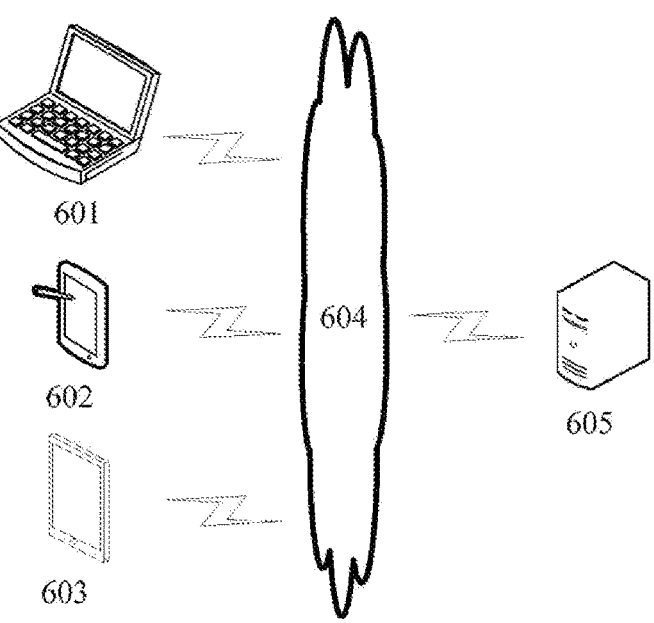
FIG. 6 is an exemplary system architecture to which an embodiment of a method for interaction of the present disclosure can be applied.

Please refer to FIG. 6 which shows an exemplary system architecture to which an method for interaction of one embodiment of the present disclosure may be applied.

As shown in FIG. 6, the system architecture may include terminal devices 601, 602, 603, network 604, and a server 605. Network 604 is a medium used to provide communication links between terminal devices 601, 602, 603, and a server 605. Network 604 can include various connection types, such as wired, wireless communication links, or fiber optic cables.

Terminal devices 601, 602, and 603 can interact with server 605 through network 604 to receive or send messages, etc. Various client applications can be installed on terminal devices 601, 602, and 603, such as web browser applications, search applications, and news and information applications. The client applications in terminal devices 601, 602, and 603 can receive user instructions and complete corresponding functions according to the user's instructions, such as adding corresponding information to the information according to the user's instructions.

Terminal devices 601, 602, and 603 can be hardware or software. When terminal devices 601, 602, and 603 are hardware, they can be various electronic devices with display screens and support web browsing, including but not limited to smartphones, tablets, e-book readers, MP3 players (Moving Picture Experts Group Audio Layer III), MP4 players (Moving Picture Experts Group Audio Layer IV), laptops and desktop computers, and more. When terminal devices 601, 602, and 603 are software, they can be installed in the electronic devices listed above. It can be implemented as multiple software or software modules (such as software or software modules used to provide distributed services), or as a single software or software module, which is not limited here.

Server 605 can be a server that provides various services, such as receiving information acquisition requests sent by terminal devices 601, 602, and 603, and acquiring display information corresponding to the information acquisition requests in various ways based on the information acquisition requests. And the relevant data of the display information is sent to the terminal devices 601, 602, and 603.

It is to be noted that the presentation method provided in the present embodiment may be executed by the terminal equipment, and accordingly the presentation apparatus may be arranged in the terminal equipment 601, 602, 603. In addition, the method for interaction provided by the present disclosure embodiment may also be executed by the server 605, and accordingly, the presentation apparatus may be arranged in the server 605.

It is to be understood that the number of terminal devices, networks, and servers shown in FIG. 6 is only for the propose of illustration. Depending on the implementation, any number of terminals, networks, and servers may be included.

Figure 7:
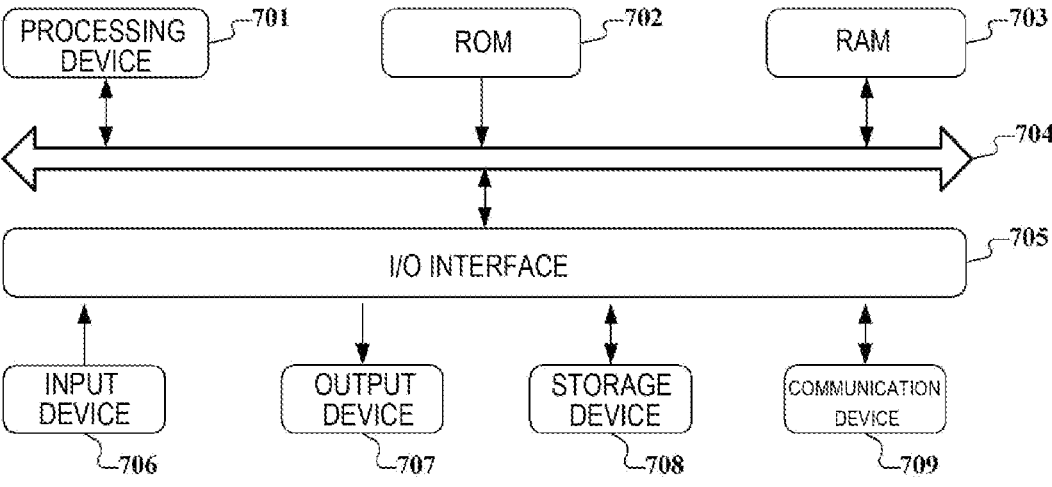
FIG. 7 is a schematic diagram of the basic structure of an electronic device according to an embodiment of the present disclosure.

Reference is now made to FIG. 7, illustrates a schematic diagram of the basic structure of an electronic device (the terminal device or server shown in FIG. 6) proposed according to embodiments of the present disclosure. The terminal devices in embodiments of the present disclosure may include, but are not limited to, mobile terminals such as mobile phones, laptops, digital broadcasting receivers, personal digital assistants (PDAs), portable android devices (PADs), portable multimedia players (PMPs), terminals on broad (such as navigation terminals on broad), and fixed terminals such as digital TVs, desktop computers, and the like. The electronic device shown in FIG. 7 is only for the propose of illustration and should not suggest any limitations on the functionality and scope of use of the disclosed embodiment.

As shown in FIG. 7, the electronic device may include a processing device (e.g., a central processing unit, a graphics processor, etc.) 701 that can perform various appropriate actions and processes based on programs stored in read-only memory (ROM) 702 or loaded from the storage device 708 into random access memory (RAM) 703. In RAM 703, various programs and data required for the operation of the electronic device 800 are also stored. The processing unit 701, ROM 702, and RAM 703 are connected to each other via bus 704. The input/output (I/O) interface 705 is also connected to bus 704.

In general, the following devices can be connected to the I/O interface 705: an input device 706 including, for example, touch screen, touchpad, keyboard, mouse, camera, microphone, accelerometer, gyroscope, etc.; an output device 707 such as liquid crystal display (LCD), speakers, vibrators, etc.; a storage device 708 such as magnetic tape, hard disk, etc.; and a communication device 709. The communication device 709 may allow electronic devices to communicate wirelessly or wired with other devices to exchange data. Although FIG. 7 shows an electronic device with a variety of devices, it is to be understood that it is not required to implement or deploy all of the devices shown. More or fewer apparatuses may be implemented or possessed instead.

Specifically, according to the disclosed embodiments, the process described above with reference to the flowchart can be implemented as a computer software program. For example, the disclosed embodiment includes a computer program product that includes a computer program carried on a non-transient computer-readable medium, which includes program code for executing the method shown in the flowchart. In such embodiments, the computer program can be downloaded and installed from the network through communication device 709, or installed from storage device 708, or installed from ROM 702. When the computer program is executed by the processing device 701, the above-mentioned functions defined in the method of the present disclosed embodiment are executed.

It is to be noted that the computer-readable medium mentioned in this disclosure can be a computer-readable signal medium, a computer-readable storage medium, or any combination of the two. Computer readable storage media can be, for example, but not limited to, systems, devices or devices of electricity, magnetism, light, electromagnetism, infrared, or semiconductors, or any combination of the above. More specific examples of computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices Or any suitable combination of the above. In this disclosure, a computer-readable storage medium may be any tangible medium that contains or stores a program, which can be used by or in combination with an instruction execution system, device, or device. In this disclosure, computer-readable signal media may include data signals propagated in the baseband or as part of the carrier wave, which carry computer-readable program code. This propagation of data signals can take various forms, including but not limited to electromagnetic signals, optical signals, or any suitable combination of the above. A computer-readable signal medium can also be any computer-readable medium other than a computer-readable storage medium, which can send, propagate, or transmit programs for use by or in combination with instruction execution systems, devices, or devices. The program code contained on computer readable media can be transmitted using any suitable medium, including but not limited to wires, optical cables, RF (radio frequency), etc., or any suitable combination of the above.

In some implementations, clients and servers can communicate using any currently known or future developed network protocol such as HTTP (HyperText Transfer Protocol) and can interconnect with any form or medium of digital data communication (such as communication networks). Examples of communication networks include local area networks ("LANs"), wide area networks ("WANs"), internets (such as the Internet), and end-to-end networks (such as ad hoc end-to-end networks), as well as any currently known or future developed networks.

The computer readable medium mentioned above can be included in the electronic device mentioned above; it can also exist separately without being assembled into the electronic device.

The computer readable medium carries one or more programs. When one or more programs are executed by the electronic device, cause the electronic device to generate a cross-group transmitting instruction based on an operation of a participant object in a multimedia meeting for a cross-group transmitting control, wherein the multimedia meeting comprises at least two meeting spaces, the cross-group transmitting instruction comprises an identification of a source participant object and an identification of a destination meeting space; obtaining a multimedia stream of the source participant object in response to the cross-group transmitting instruction; and transmitting the multimedia stream of the source participant object to a participant object in the destination meeting space.

In some embodiments, the obtaining a multimedia stream of the source participant object to the in response to the cross-group transmitting instruction comprises: obtaining the multimedia stream generated by the source participant object after a generation time instant of the cross-group transmitting instruction in response to the cross-group transmitting instruction.

In some embodiments, the transmitting the multimedia stream of the source participant object to the participant object in the destination meeting space comprises: establishing a subscription correspondence between the participant object of the destination meeting space and the source participant object, based on the cross-group instruction; and transmitting, based on the established subscription correspondence, the multimedia stream generated by the source participant object to the participant object in the destination meeting space.

In some embodiments, the multimedia stream comprises a first presentation content being presented by the source participant object.

In some embodiments, the method further comprises: displaying the multimedia stream of the source participant object in a multimedia meeting interface of the destination meeting space.

In some embodiments, the displaying the multimedia stream of the source participant object in a multimedia meeting interface of the destination meeting space comprises: displaying the multimedia stream of the source participant object in the multimedia meeting interface of the destination meeting space, and displaying the multimedia stream of the participant object in the destination meeting space.

In some embodiments, the displaying the multimedia stream of the source participant object in a multimedia meeting interface of the destination meeting space comprises: displaying the multimedia stream of the source participant object in a shared content presenting region of the destination meeting space.

In some embodiments, the displaying the multimedia stream of the source participant object in a shared content presenting region of the destination meeting space comprises: in response to a second presentation content being displayed in the shared content presenting region of the destination meeting space, replacing the second presentation content displayed in the shared content presenting region with the multimedia stream of the source participant object.

In some embodiments, the in response to a second presentation content being displayed in the shared content presenting region of the destination meeting space, replacing the second presentation content displayed in the shared content presenting region with the multimedia stream of the source participant object comprises: in response to the second presentation content being displayed in the shared content presenting region of the destination meeting space, determining whether the multimedia stream of the source participant object comprises the first presentation content; and in accordance with a determination that the multimedia stream of the source participant object comprises the first presentation content, replacing the second presentation content displayed in the shared content presenting region with the first presentation content.

In some embodiments, the displaying the multimedia stream of the source participant object in a shared content presenting region of the destination meeting space comprises: in response to the second presentation content being displayed in the shared content presenting region of the destination meeting space, displaying the second presentation content and the multimedia stream of the source participant object in the shared content presenting region of the destination meeting space.

In some embodiments, the multimedia stream comprises a first presentation content; and the in response to the second presentation content being displayed in the shared content presenting region of the destination meeting space, displaying the second presentation content and the multimedia stream of the source participant object in the shared content presenting region of the destination meeting space comprises: in response to the second presentation content being displayed in the shared content presenting region of the destination meeting space, displaying the first presentation content and the second presentation content in the shared content presenting region of the destination meeting space.

In some embodiments, the cross-group transmitting instruction comprises a content type; and the method further comprises: displaying a cross-group transmitting content configuration control; determining the content type based on an operation for the content type configuration control, wherein a content type indicates a type of a multimedia stream transmitted to the destination meeting space; and the transmitting the multimedia stream of the source participant object to the participant object in the destination meeting space comprises: filtering, from the multimedia stream of the source participant object, a multimedia stream that conforms to the content type in the cross-group transmitting instruction; and transmitting the filtered multimedia stream to the participant object of the destination meeting space.

In some embodiments, the content type comprises at least one of: an audio, a user environment image collected in real time, a shared screen, a shared document.

In some embodiments, the generating a cross-group transmitting instruction based on an operation of a participant object in a multimedia meeting for a cross-group transmitting control comprises: displaying a cross-group transmitting configuration interface, wherein the cross-group transmitting configuration interface comprises at least one of: a source participant object configuration control and a destination meeting space configuration control; determining the identification of the source participant object based on an operation for the source participant object configuration control; determining the identification of the destination meeting space based on an operation for the destination meeting space configuration control; and generating the cross-group transmitting instruction in response to detecting an operation for a transmitting confirmation control.

In some embodiments, the generating a cross-group transmitting instruction based on an operation of a participant object in a multimedia meeting for a cross-group transmitting control comprises: displaying a boot control in the multimedia meeting interface having a cross-group transmitting permission; and displaying the cross-group transmitting configuration interface in response to detecting a trigger operation for the boot control.

In some embodiments, the generating a cross-group transmitting instruction based on an operation of a participant object in a multimedia meeting on a cross-group transmitting control comprises: displaying a transmitting confirmation control; in response to detecting a trigger operation for the transmitting confirmation control, determining the local login user as the source participant object, and determining all or part of the meeting space as the destination meeting space; and generating the cross-group transmitting instruction with the determined source participant object and destination meeting space.

In some embodiments, the method further comprises: generating a transmitting ending instruction in response to a predefined transmitting ending action; and stopping transmitting the multimedia stream of the source participant object to the participant object in the destination meeting space in response to the transmitting ending instruction.

In some embodiments, the electronic equipment is further configured to the generating a transmitting ending instruction in response to a predefined transmitting ending action comprises: displaying a transmitting confirmation control of a first type; in response to detecting a trigger operation for the transmitting confirmation control of the first type, generating the cross-group transmitting instruction and displaying a transmitting cancellation control; and in response to detecting a trigger operation for a transmitting cancellation control, generating the transmitting ending instruction.

In some embodiments, the generating a transmitting ending instruction in response to a predefined transmitting end action comprises: displaying a transmitting confirmation control of a second type; generating the cross-group transmitting instruction in response to the detecting a continuous pressing operation for the second type of transmitting confirmation control; and generating the transmitting ending instruction in response to detecting the end of the continuous pressing operation.

In some embodiments, the multimedia meeting comprises a plurality of discussion groups, each of the discussion groups comprises at least a part of participant objects of the plurality of multimedia meeting, and the destination meeting space is at least one of the plurality of discussion groups.

In some embodiments, the source participant object is in one of the discussion groups.

In some embodiments, the multimedia meeting comprises a main venue, the main venue comprises a participant object which is not in any discussion group, and the source participant object is in the main venue.

In some embodiments, the cross-group transmitting permission is used for indicating a permission for transmitting the multimedia stream instruction of the source participant object to the destination meeting space, wherein the destination meeting space is a meeting space different from the meeting space where the source meeting space is located.

Computer program code for executing the operations disclosed herein may be written in one or more programming languages or combinations thereof, including but not limited to object-oriented programming languages such as Java, Smalltalk, C++, as well as conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In cases involving remote computers, the remote computer can be connected to the user's computer through any type of network, including a local area network (LAN) or wide area network (WAN), or can be connected to an external computer (such as using an Internet service provider to connect through the Internet).

The flowchart and block diagram in the attached figure illustrate the possible architecture, functions, and operations of systems, methods, and computer program products according to various embodiments of the present disclosure. At this point, each box in a flowchart or block diagram can represent a module, program segment, or part of code that contains one or more executable instructions for implementing specified logical functions. It should also be noted that in some alternative implementations, the functions indicated in the boxes can also occur in a different order than those indicated in the accompanying drawings. For example, two consecutive boxes can actually be executed in parallel, and sometimes they can also be executed in the opposite order, depending on the function involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The units described in the present disclosed embodiment can be implemented through software or hardware. Among them, the name of the unit does not constitute a qualification for the unit itself in a certain situation, for example, the first determination unit can also be described as "the unit that determines whether the as-is presentation condition is met".

The functions described above in this article can be at least partially executed by one or more hardware logic components. For example, non-limiting examples of hardware logic components that can be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

In the context of this disclosure, machine readable media can be tangible media that can contain or store programs for use by or in combination with instruction execution systems, devices, or devices. A machine readable media can be machine readable signal media or machine readable storage media. A machine readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The above description is only a preferred embodiment of this disclosure and an explanation of the technical principles used. Those skilled in the art should understand that the scope of disclosure involved in the present disclosure is not limited to technical solutions formed by specific combinations of the aforementioned technical features, but also covers other technical solutions formed by any combination of the aforementioned technical features or their equivalent features without departing from the disclosed concept. For example, a technical solution formed by replacing the above features with (but not limited to) technical features with similar functions disclosed in this disclosure.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method for interaction, comprising:
generating a cross-group transmitting instruction in response to an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space;
obtaining a multimedia stream of the source participant object in response to the cross-group transmitting instruction;
transmitting the multimedia stream of the source participant object to a participant object in the destination meeting space; and
displaying the multimedia stream of the source participant object in a shared content presenting region of the destination meeting space, comprising:
in response to a second presentation content being displayed in the shared content presenting region of the destination meeting space, determining whether the multimedia stream of the source participant object comprises a first presentation content presented by the source participant object; and
in accordance with a determination that the multimedia stream of the source participant object comprises the first presentation content, replacing the second presentation content displayed in the shared content presenting region with the first presentation content.

2. The method of claim 1, wherein the obtaining a multimedia stream of the source participant object to the in response to the cross-group transmitting instruction comprises:
obtaining the multimedia stream generated by the source participant object after the cross-group transmitting instruction in response to the cross-group transmitting instruction.

3. The method of claim 1, wherein the transmitting the multimedia stream of the source participant object to the participant object in the destination meeting space comprises:
establishing a subscription correspondence between the participant object of the destination meeting space and the source participant object, based on the cross-group instruction; and
transmitting, based on the subscription correspondence, the multimedia stream generated by the source participant object to the participant object in the destination meeting space.

4. The method of claim 1, wherein the method further comprises:
displaying the multimedia stream of the source participant object in a multimedia meeting interface of the destination meeting space.

5. The method of claim 4, wherein the displaying the multimedia stream of the source participant object in a multimedia meeting interface of the destination meeting space comprises:
displaying the multimedia stream of the source participant object in the shared content presenting region of the destination meeting space.

6. The method of claim 5, wherein the displaying the multimedia stream of the source participant object in a shared content presenting region of the destination meeting space comprises:

in response to the second presentation content being displayed in the shared content presenting region of the destination meeting space, displaying the second presentation content and the multimedia stream of the source participant object in the shared content presenting region of the destination meeting space.

7. The method of claim 6, wherein the multimedia stream comprises a first presentation content; and the in response to the second presentation content being displayed in the shared content presenting region of the destination meeting space, displaying the second presentation content and the multimedia stream of the source participant object in the shared content presenting region of the destination meeting space comprises:

in response to the second presentation content being displayed in the shared content presenting region of the destination meeting space, displaying the first presentation content and the second presentation content in the shared content presenting region of the destination meeting space.

8. The method of claim 1, wherein the cross-group transmitting instruction comprises a content type; and the method further comprises:

displaying a cross-group transmitting content configuration control;

determining the content type based on an operation for the content type configuration control, wherein a content type indicates a type of a multimedia stream transmitted to the destination meeting space; and the transmitting the multimedia stream of the source participant object to the participant object in the destination meeting space comprises:

filtering, from the multimedia stream of the source participant object, a multimedia stream that conforms to the content type in the cross-group transmitting instruction; and transmitting the filtered multimedia stream to the participant object of the destination meeting space.

9. The method of claim 1, wherein the generating a cross-group transmitting instruction based on an operation of a participant object in a multimedia meeting for a cross-group transmitting control comprises:

displaying a cross-group transmitting configuration interface, wherein the cross-group transmitting configuration interface comprises at least one of: a source participant object configuration control and a destination meeting space configuration control;

determining the identification of the source participant object based on an operation for the source participant object configuration control;

determining the identification of the destination meeting space based on an operation for the destination meeting space configuration control; and generating the cross-group transmitting instruction in response to detecting an operation for a transmitting confirmation control.

10. The method of claim 9, wherein the generating a cross-group transmitting instruction based on an operation of a participant object in a multimedia meeting for a cross-group transmitting control comprises:

displaying a boot control in the multimedia meeting interface having a cross-group transmitting permission; and displaying the cross-group transmitting configuration interface in response to detecting a trigger operation for the boot control.

11. The method of claim 1, wherein the generating a cross-group transmitting instruction based on an operation of a participant object in a multimedia meeting on a cross-group transmitting control comprises:

displaying a transmitting confirmation control;

in response to detecting a trigger operation for the transmitting confirmation control, determining the local login user as the source participant object, and determining all or part of the meeting space as the destination meeting space; and generating the cross-group transmitting instruction with the determined source participant object and destination meeting space.

12. The method of claim 1, wherein the method further comprises:

generating a transmitting ending instruction in response to a predefined transmitting ending action; and stopping transmitting the multimedia stream of the source participant object to the participant object in the destination meeting space in response to the transmitting ending instruction.

13. The method of claim 12, wherein the generating a transmitting ending instruction in response to a predefined transmitting ending action comprises:

displaying a transmitting confirmation control of a first type;

in response to detecting a trigger operation for the transmitting confirmation control of the first type, generating the cross-group transmitting instruction and displaying a transmitting cancellation control; and in response to detecting a trigger operation for a transmitting cancellation control, generating the transmitting ending instruction, or wherein the generating a transmitting ending instruction in response to a predefined transmitting end action comprises:

displaying a transmitting confirmation control of a second type;

generating the cross-group transmitting instruction in response to the detecting a continuous pressing operation for the second type of transmitting confirmation control; and generating the transmitting ending instruction in response to detecting the end of the continuous pressing operation.

14. The method of claim 1, wherein the multimedia meeting comprises a plurality of discussion groups, each of the discussion groups comprises at least a part of participant objects of the plurality of multimedia meeting, and the destination meeting space is at least one of the plurality of discussion groups.

15. The method of claim 14, wherein the source participant object is in one of the discussion groups, or wherein the multimedia meeting comprises a main venue, the main venue comprises a participant object which is not in any discussion group, and the source participant object is in the main venue.

16. The method of claim 10, wherein the cross-group transmitting permission is configured for indicating a permission for transmitting the multimedia stream instruction of the source participant object to the destination meeting space, wherein the destination meeting space is a meeting space different from the meeting space where the source meeting space is located.

17. An electronic device, comprising:
one or more processors; and
a memory for storing one or more programs,
the one or more programs, when executed by the one or more processors, cause the one or more processors to implement a method, the method comprising:
generating a cross-group transmitting instruction in response to an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space;
obtaining a multimedia stream of the source participant object in response to the cross-group transmitting instruction;
transmitting the multimedia stream of the source participant object to a participant object in the destination meeting space; and
displaying the multimedia stream of the source participant object in a shared content presenting region of the destination meeting space, comprising:
in response to a second presentation content being displayed in the shared content presenting region of the destination meeting space, determining whether the multimedia stream of the source participant object comprises a first presentation content presented by the source participant object; and
in accordance with a determination that the multimedia stream of the source participant object comprises the first presentation content, replacing the second presentation content displayed in the shared content presenting region with the first presentation content.

18. A non-transitory computer-readable storage medium having a computer program stored thereon, the computer program, when executed by a processor, causes the method comprising:
generating a cross-group transmitting instruction in response to an operation of a participant object in a multimedia meeting for a cross-group transmitting control, wherein the multimedia meeting comprises at least two meeting spaces, the cross-group transmitting instruction comprises an identification of a source participant object and an identification of a destination meeting space, wherein the source participant object is not in the destination meeting space;
obtaining a multimedia stream of the source participant object in response to the cross-group transmitting instruction;
transmitting the multimedia stream of the source participant object to a participant object in the destination meeting space; and
displaying the multimedia stream of the source participant object in a shared content presenting region of the destination meeting space, comprising:
in response to a second presentation content being displayed in the shared content presenting region of the destination meeting space, determining whether the multimedia stream of the source participant object comprises a first presentation content presented by the source participant object; and
in accordance with a determination that the multimedia stream of the source participant object comprises the first presentation content, replacing the second presentation content displayed in the shared content presenting region with the first presentation content.

* * * * *